United States Patent
Smiley et al.

(10) Patent No.: US 7,463,905 B1
(45) Date of Patent: *Dec. 9, 2008

(54) CELLULAR TELEPHONY MAST CABLE REDUCTION

(75) Inventors: Russell Smiley, Nepean (CA); Paul Astell, Barhaven (CA); Steve A. Beaudin, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 322 days.

This patent is subject to a terminal disclaimer.

(21) Appl. No.: 11/007,301

(22) Filed: Dec. 9, 2004

(51) Int. Cl.
*H04M 1/00* (2006.01)

(52) U.S. Cl. .................. 455/562.1; 421/77; 421/143; 343/701

(58) Field of Classification Search ............ 421/77, 421/143, 137; 330/295; 455/562.1; 343/701
See application file for complete search history.

(56) References Cited

U.S. PATENT DOCUMENTS

| | | | | |
|---|---|---|---|---|
| 5,001,725 | A * | 3/1991 | Senderowicz et al. | 375/247 |
| 5,559,514 | A * | 9/1996 | Thomson | 341/143 |
| 6,404,367 | B1 * | 6/2002 | Van der Zwan et al. | 341/143 |
| 6,445,318 | B1 * | 9/2002 | Ruha et al. | 341/131 |
| 6,977,546 | B2 * | 12/2005 | Stapleton | 330/10 |
| 7,053,700 | B2 * | 5/2006 | Smiley et al. | 330/10 |
| 7,053,838 | B2 * | 5/2006 | Judd | 343/701 |
| 7,081,793 | B2 * | 7/2006 | Morris et al. | 330/10 |
| 2004/0036638 | A1 * | 2/2004 | Lipka | 341/143 |
| 2004/0239416 | A1 * | 12/2004 | Smiley et al. | 330/10 |
| 2005/0062526 | A1 * | 3/2005 | Morris et al. | 330/10 |

* cited by examiner

*Primary Examiner*—Matthew Anderson
*Assistant Examiner*—Perez M Angelica
(74) *Attorney, Agent, or Firm*—Trop, Pruner & Hu, P.C.

(57) ABSTRACT

In cellular telephony, a plurality of communication signals which are received at a base station for wireless transmission are multiplexed onto a single physical medium which runs up a mast. This reduces the use of cabling running up the mast with an attendant savings in cost.

14 Claims, 8 Drawing Sheets

FIG. 9

CELLULAR TELEPHONY MAST CABLE REDUCTION

BACKGROUND

This invention relates to a method and system for the handling of cellular signals.

A typical base station in a cellular telephony system receives signals on wire lines for transmission. These signals are converted to radio frequency (RF) signals in the same frequency band and amplified. The amplified RF signals are then sent up a mast along RF cables (i.e., co-axial cables) to an antenna structure at the head (top) of the mast which radiates the signals. In a one known set-up, the 360 degrees of azimuth are notionally divided into three sectors of 120 degrees of azimuth each. A directional antenna is provided to cover each sector so that RF signals can be radiated in a selected direction.

The antennae also receive RF signals and pass these down to receivers at the base station. The received signals are typically at a different frequency than the transmitted signals such that the received signal for a sector is typically multiplexed onto the same RF cable carrying the signals for transmission to that sector. In a typical set-up, the described antennae are the main antennae for each sector and each sector also has a second, diversity, antenna. The diversity antenna is provided to improve received signal strength. With this set-up, there are typically three transmitters in the base station, one for each sector, and there are typically two RF cables running up the mast for each sector: one which carries signals for transmission and the main received signal, and a second which carries the received signal from the diversity antenna.

Typically, the RF cable is as low loss as possible to improve the efficiency of the system. However, low loss RF cable is expensive.

This invention seeks to ameliorate this problem.

SUMMARY OF INVENTION

In this invention for use in cellular telephony, a plurality of communication signals which are received at a base station for wireless transmission are multiplexed onto a single physical medium which runs up a mast. This reduces the use of cabling running up the mast with an attendant savings in cost.

In accordance with this invention, there is provided a method for use in transmitting cellular signals comprising: receiving a plurality of communication signals for wireless transmission; and multiplexing said communication signals onto a single physical medium, said single physical medium running up a mast.

According to another aspect of the present invention, there is provided a method for use in transmitting cellular signals, comprising: converting each of a plurality of radio frequency (RF) signals for transmission from a base station to non-overlapping intermediate frequency (IF) signals; multiplexing said IF signals into a composite signal.

According to a further aspect of the invention, there is provided a cellular telephony base station (BTS) radio frequency (RF) signal handler, comprising: a plurality of frequency converters for converting a like plurality of communication signals for transmission to a like plurality of non-overlapping intermediate frequency (IF) signals; a multiplexer for multiplexing each of said IF signals into a composite signal for transmission over an RF cable to a mast head.

According to a yet further aspect of the invention, there is provided a cellular signal handling system comprising: a first frequency converter for converting a plurality of communication signals for transmission to a like plurality of non-overlapping intermediate frequency (IF) signals; a multiplexer for multiplexing each of said IF signals into a composite signal; a de-multiplexer for de-multiplexing said composite signal; an RF cable having a first end operatively connected to an output of said multiplexer and a second end operatively connected to an input of said de-multiplexer; a second frequency converter operatively connected to an output of said de-multiplexer for converting said IF signals to radio frequency (RF) signals; a power amplifier (PA) for each of said plurality of IF signals, each power amplifier operatively connected to an output of said second frequency converter; and an antenna operatively connected to an output of each said PA.

According to a further aspect of the invention, there is provided a method for use in transmitting cellular signals comprising: modulating an input signal for transmission to obtain a sigma-delta modulated (SDM) signal; decomposing said SDM signal into a plurality of two state signals; fibre optically transmitting said two state signals up a mast.

Other features and advantages will become apparent from a review of the following description in conjunction with the drawings.

DRAWINGS

In the drawings which illustrate example embodiments of the invention.

DETAILED DESCRIPTION

Figure 1:
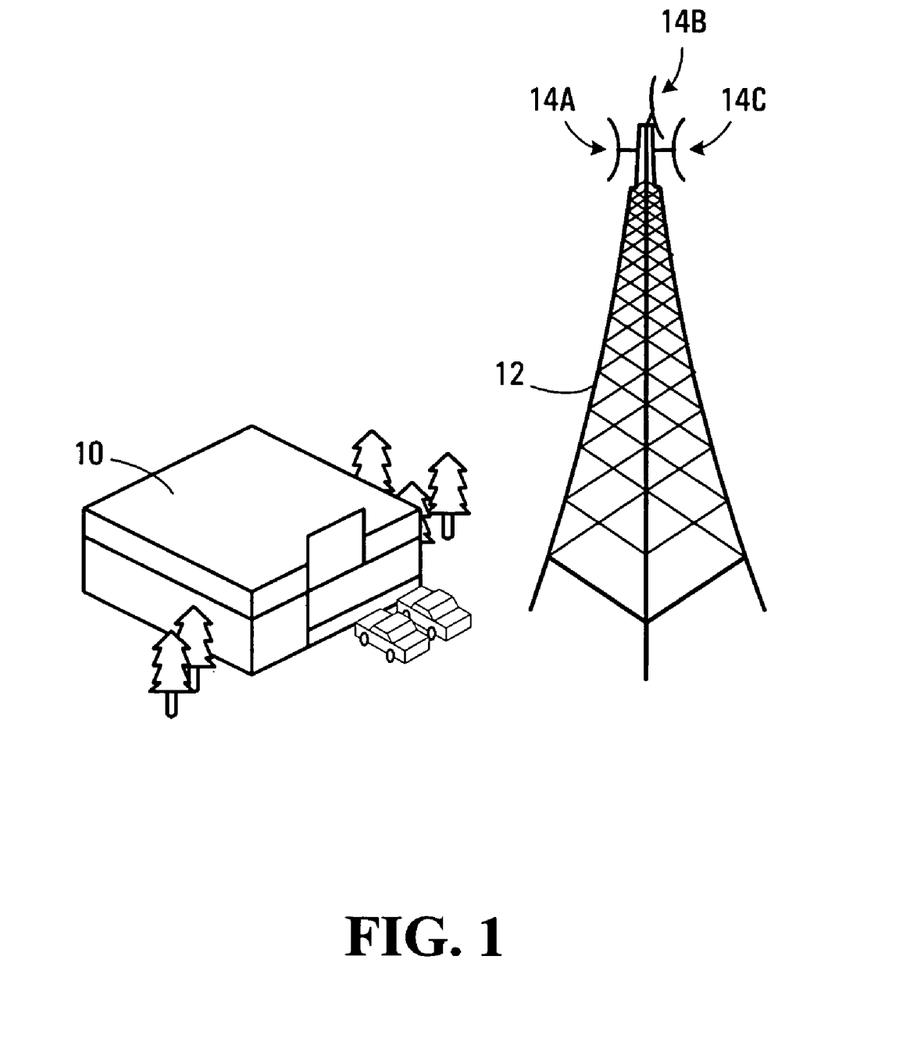
FIG. 1 is a simplified perspective view of a base station (BTS) and mast for use in cellular communications.

Turning to FIG. 1, a base station 10 for cellular telephony is associated with a mast, or tower, 12 topped with radio frequency antennae 14a, 14b, 14c. Each antenna is configured to radiate signals in one sector. Referencing FIG. 2, the base station (BTS) has three transceivers 16a, 16b, 16c, each transceiver 16a, 16b, 16c for sending signals to, and receiving signals from a respective, one of the antennae 14a, 14b, 14c. Thus, each transceiver is for use in transmitting and receiving signals in one sector. The transceivers output to a multiplexer 18 (shown in a distributed fashion for ease of illustration) and receive input from de-multiplexer 20 (shown in a distributed fashion for ease of illustration).

Figure 3:
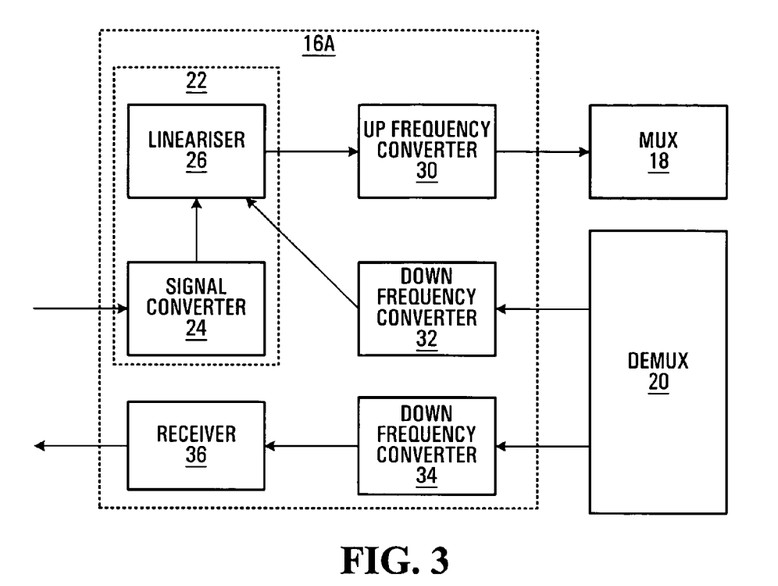
FIG. 3 is a schematic detail of a portion of FIG. 2.

Turning to FIG. 3, transceiver 16a has a transmitter 22 with a signal converter 24 that is input with a communication signal from a remote source. This communication signal may be received wirelessly or on a wire line and may be a radio frequency signal or a signal having another format, as will be understood by those skilled in the art. The signal converter 24 outputs the communication signal as a baseband signal to a lineariser 26 of the transmitter. The lineariser distorts the baseband communication signal and outputs the pre-distorted signal to an up frequency converter 30. The up frequency converter converts the pre-distorted baseband communication signal to an intermediate frequency (IF) and outputs the IF signal to multiplexer 18.

A down frequency converter 32 receives an IF correction signal from demultiplexer 20 and outputs a baseband correction signal to lineariser 26. A further down frequency converter 34 receives an IF received communication signal from demultiplexer 20 and outputs a baseband received communication signal to receiver 36.

Transceivers 16b and 16c are identically constructed to transceiver 16a and parts in such transceivers are referred to with the reference numbers of the like parts of transceiver 16a. However, up frequency converter 30 and the up frequency converter of each of transceivers 16b, 16c are configured so that each of these frequency converters converts to an intermediate frequency that does not overlap with the intermediate frequency output by the other up frequency converters of the BTS. Thus, each up frequency converter in the BTS outputs a different IF and these up frequency converters output to multiplexer 18, which multiplexes their signals.

Returning to FIG. 2, the multiplexer 18 and the de-multiplexer 20 are connected to one end of a radio frequency cable 40 that runs up the mast 12 (FIG. 1). At the head 42 of the mast, a multiplexer 44 (shown in a distributed fashion for ease of illustration) and a de-multiplexer 46 (shown in a distributed fashion for ease of illustration) are connected to the other end of the cable 40.

Figure 4:
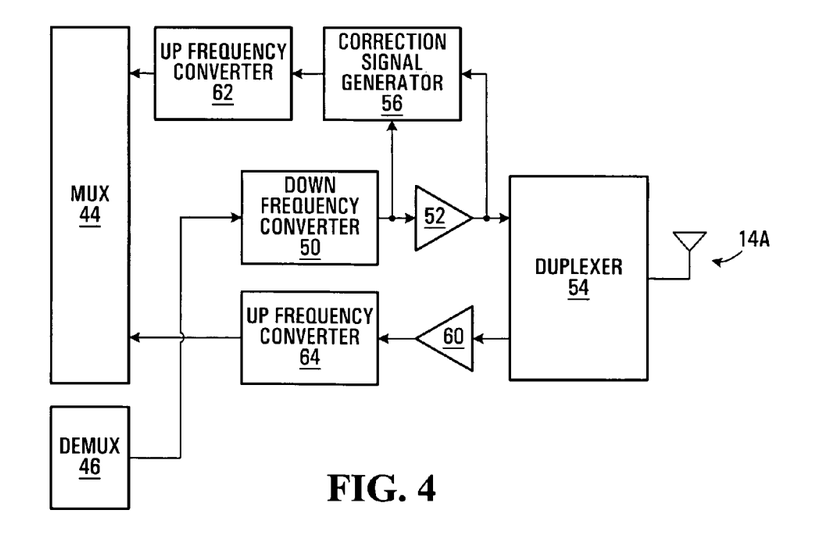
FIG. 4 is a schematic detail of another portion of FIG. 2.

Turning to FIG. 4 which details the components associated with antenna 14a, the demultiplexer 46 outputs to a down frequency converter 50. Down frequency converter 50 down converts an IF communication signal back to an RF signal. The down frequency converter 50 outputs to a power amplifier 52 and a correction signal generator 56. The amplifier 52 outputs to both a duplexer 54 and the correction signal generator 56. The correction signal generator outputs to up frequency converter 58 which, in turn, outputs to multiplexer 44. The duplexer 54 is connected for two-way communication with antenna 14a.

The duplexer also outputs to low noise amplifier 60 which, in turn, outputs to up frequency converter 64. The up frequency converter 64 outputs to multiplexer 44.

Up frequency converter 64 converts a received RF communication signal to an IF communication signal that will be received by down frequency converter 34 (FIG. 3). Up frequency converter 64 is configured so that it converts signals to a different IF than the IF to which up frequency converter 62 converts signals.

The components associated with antennae 14b and 14c are identical to the components associated with antennae 14a and parts associated with such antennae are referred to with the reference numbers of the like parts of the antenna 14a. However, each of the up frequency converters associated with the antennae 14a, 14b, 14c are configured to convert signals to different intermediate frequencies.

While the frequency converters have been described as up and down converters to convert between baseband frequency or RF and IF, the RF may, in fact, be either lower or higher than the IF. Also, it will be appreciated that a given baseband frequency or RF is actually a baseband frequency band and, similarly, a given IF is actually an IF band.

Figure 2:
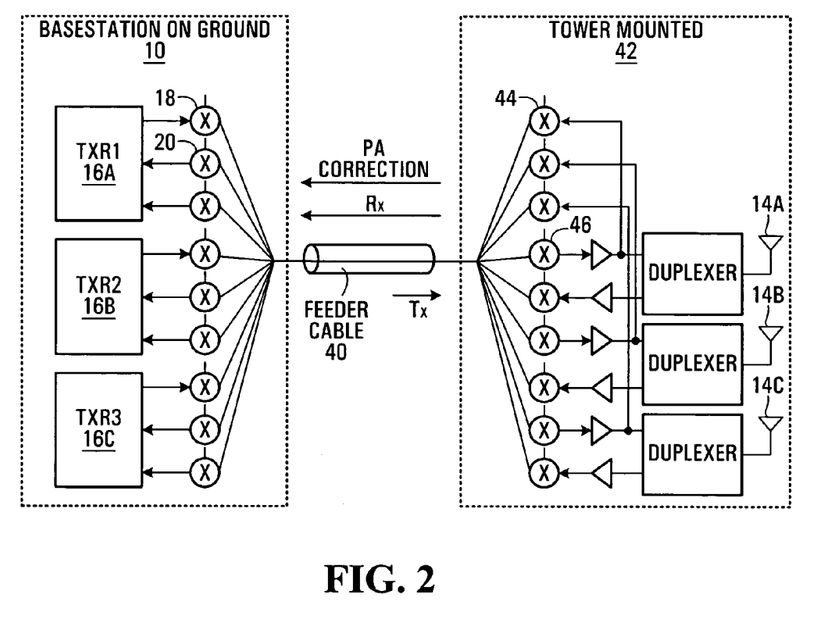
FIG. 2 is a schematic detail of the BTS and mast of FIG. 1 configured in accordance with one aspect of this invention.

In overview, the BTS 10 receives a plurality of communication signals for wireless transmission and multiplexes these onto a single physical medium (cable 40) running up the mast 12. At the top of the mast, these signals are received from the single physical medium, de-multiplexed and amplified before being wirelessly transmitted.

More specifically, signals for transmission to the three sectors are received by the signal converter 24 (FIG. 3) of each of the transceivers 16a, 16b, 16c and converted to baseband frequency signals, as required. In each transceiver, the baseband frequency signal is passed to a lineariser which, based on input from down frequency converter 32, pre-distorts the signal. As will be explained, this pre-distortion allows for linear amplification of the communication signal. The frequency of the distorted communication signal is then changed by up frequency converter 30 to an intermediate frequency and passed to multiplexer 18. The multiplexer 18 combines the IF signals from each of the transceivers 16a, 16b, 16c and outputs them to cable 40. In this regard, it will be recalled that the IF signals from the up frequency converters of the three transceivers do not overlap in frequency. Thus, all three signals may be simultaneously transmitted up the mast along cable 40 without interference.

At the top of the mast, the multiplexed signal is demultiplexed by de-multiplexer 46 such that the IF signal from a transceiver 16a, 16b, or 16c for a sector is directed to the antenna 14a, 14b, or 14c for that sector. The down frequency converter 50 associated with the antenna of a sector converts the frequency back to RF. The RF signal is then amplified by power amplifier 52. In this regard, it is most efficient to use the amplifier toward the top of its power range. However, typically an amplifier does not amplify in a linear fashion near the top of its range. Non-linearities in the amplification by amplifier 52 are detected by the correction signal generator which feeds a correction signal back toward the BTS via up frequency converter 62 and multiplexer 44. It is this correction signal, converted to an IF by converter 62, that is received by the down frequency converter 32 (FIG. 3) at the BTS and converted back to a baseband signal which then inputs the lineariser 26 at the BTS.

The amplified communication signal then passes to duplexer 54 and to the antenna of the sector for radiation.

The antenna of the sector may also receive a communication signal. As is typical, received signals have a different frequency than the transmitted signals. The received communication signal passes through the duplexer 54 and is amplified by amplifier 60. The amplified signal may then be converted to an IF which is unique for signals travelling down the mast by up frequency converter 64 and multiplexed onto cable 40 by multiplexer 44.

At the BTS, de-multiplexer 20 directs the IF signals to the appropriate down frequency converter of the appropriate transceiver. An IF signal received by down frequency converter 34 is converted to RF and passed to receiver 36.

Optionally, a correction signal generator may also be associated with low noise amplifier 60. In such case, a further IF converter is employed to convert the correction signal to an IF, which IF is unique for signals travelling down the mast, for multiplexing onto cable 40. With this arrangement, the BTS requires a further down frequency converter and lineariser to correct non-linearities introduced by the amplifier 60.

Although each IF passing up the mast is a unique IF and each IF passing down the mast is a unique IF, in some embodiments, the there may be overlap between IFs passing up the mast and IFs passing down the mast. Optionally, each correction signal generator may be part of the power amplifier with which it is associated.

Figure 5:
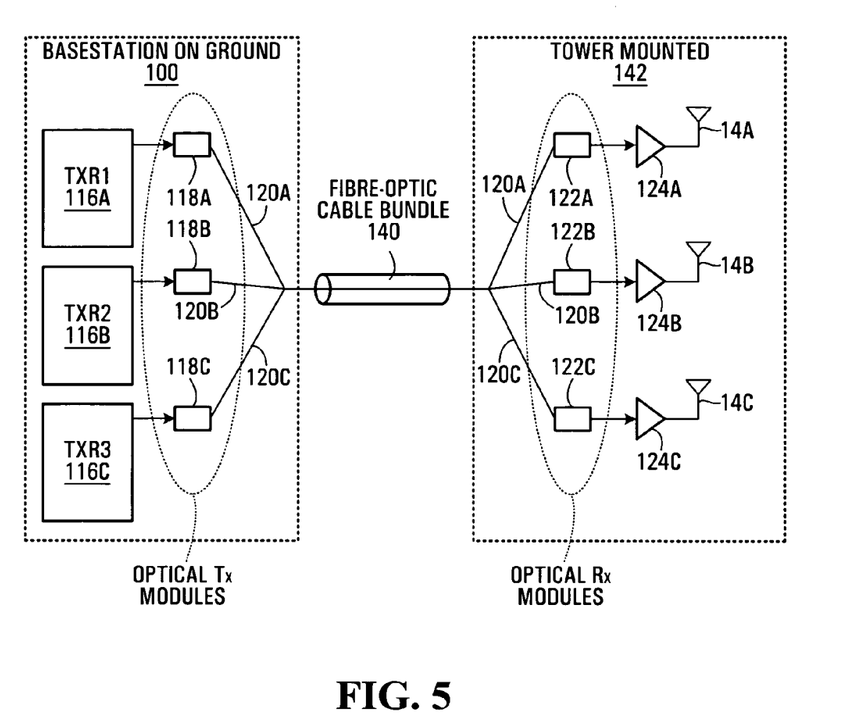
FIG. 5 is a schematic detail of the BTS and mast of FIG. 1 configured in accordance with a second aspect of this invention.

Referencing FIG. 5, in another embodiment, BTS 100 has transmitters 116a, 116b, 116c, each of which is coupled to respective electrical-to-optical converter 118a, 118b, 118c.

The electrical-optical converters output to respective optical fibre 120a, 120b, 120c. These optical fibres are bundled into cable 140 which runs up the mast. At the head 142 of the mast, the optical fibres are unbundled and each inputs one of the optical-to-electrical converters 122a, 122b, 122c. The electrical signals then pass through respective power amplifiers 124a, 124b, 124c to respective antennae 14a, 14b, 14c.

Figure 6:
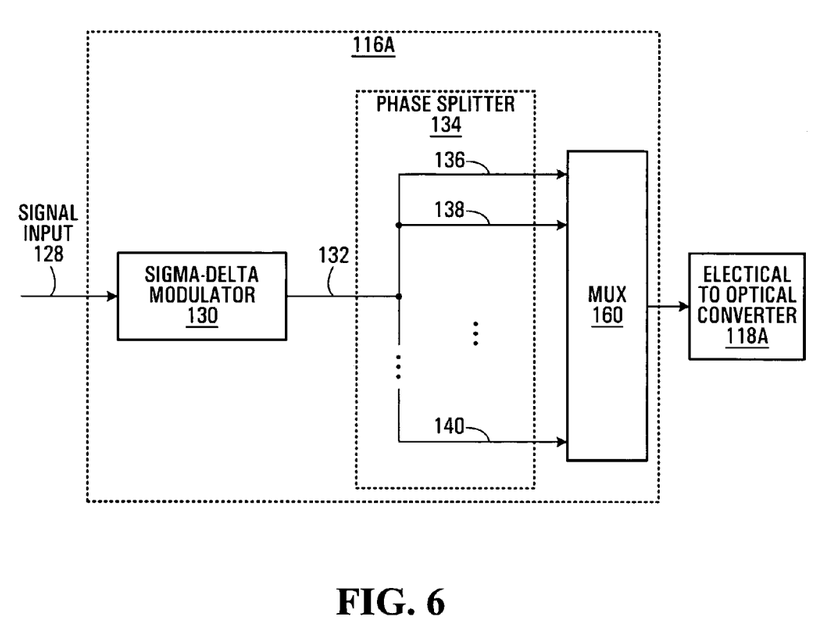
FIG. 6 is a schematic detail of a portion of FIG. 5.

FIG. 6 details transmitter 116a. Turning to this figure, a sigma-delta modulator 130 receives an input communication signal 128 from a remote source. This communication signal may be received wirelessly or on a wire line and may be a radio frequency signal or a digital signal, or a signal having another format. The Sigma-delta modulator converts the input signal to an N-level Sigma-delta modulated signal 132. The manner in which this is accomplished will be understood by one skilled in the art and is detailed in, for example "An overview of Sigma-Delta Converters", Aziz, P. et al., IEEE Signal Processing Magazine, January, 1996. A phase splitting function generally indicated at 134 takes the Sigma-delta modulated signal and produces a set of N−1 "phases" 136, 138, 140 (only three shown). The N−1 phases collectively sum to equal the Sigma-delta modulated signal 132 at any instant.

The sigma-delta modulated signal 132 consists of an N level quantized signal representable by $\log_2(N)$ bits. It noted that N does not necessarily have to be a power of 2. For example, if there are four levels, then the output of the Sigma-Delta modulator 130 can be represented by two bits. The phase splitting function 134 processes the Sigma-Delta modulated signal 130 to produce signal phases 136, 138, 140 which sum to equal the Sigma-Delta modulated signal. However, each of the phase signals is a two state signal meaning that it is either on or off. The phase splitting function 134 needs to produce N−1 2-level signals, where the Sigma-Delta modulator 130 produced an N level Sigma-Delta modulated signal 132.

Figure 7:
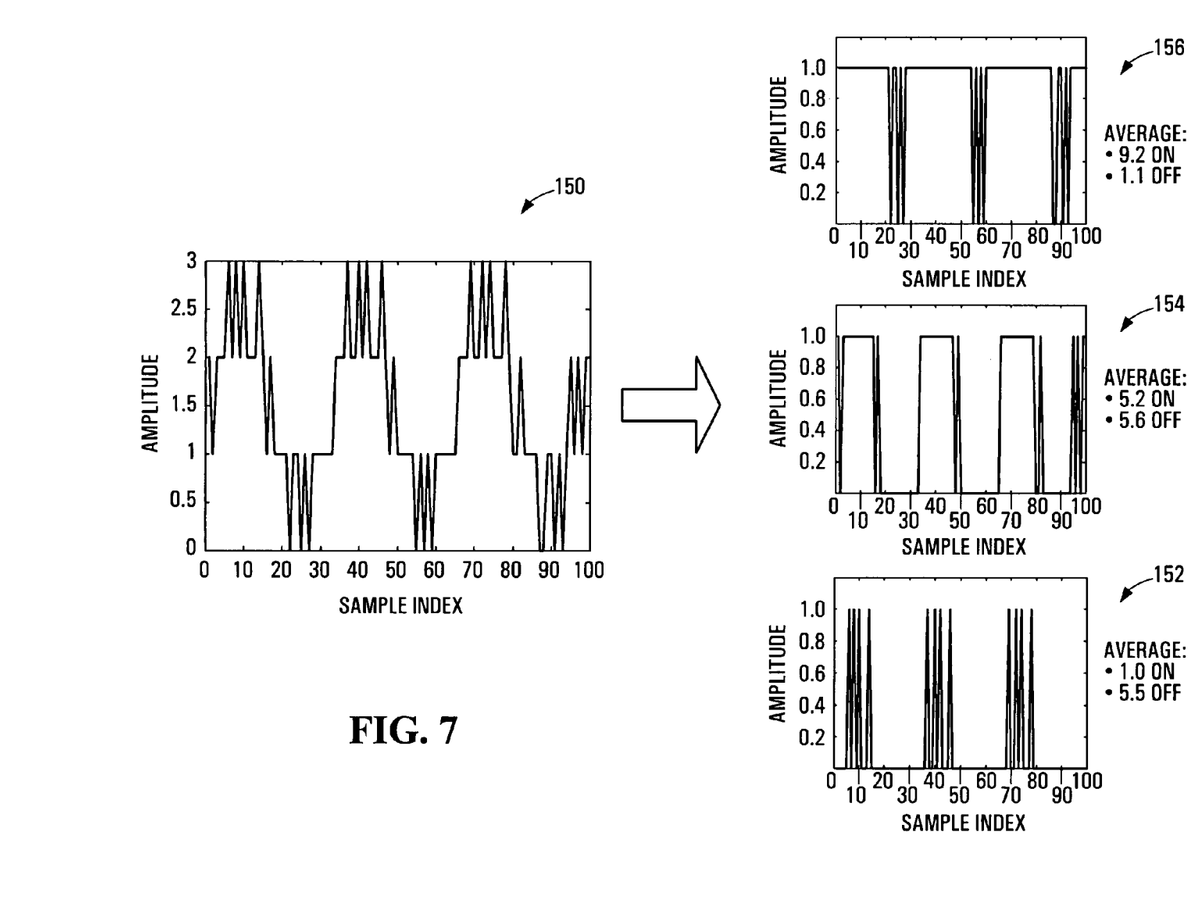
FIG. 7 is a graphical illustration of the decomposition of a Sigma-delta modulated signal.

FIG. 7 shows a simple "thresholding" phase allocation scheme implementable in the phase splitting function 134. For this example, the Sigma-Delta modulated signal 132 of FIG. 6 is generally indicated by 150. It can be seen that this is a four level signal, with the output having either a value of 0, 1, 2, or 3 with appropriate brief transition periods between these Sigma-Delta states. With thresholding phase allocation, a first phase is simply defined to be any portion of the Sigma-Delta modulated signal greater than quantization level "2". An example of such a signal is indicated at 152. The next phase will simply be any portion of the signal greater than quantization level "1". An example of such a signal as indicated generally at 154. Finally, the third phase is simply that portion of the Sigma-Delta modulated signal which is greater than quantization level "0". An example of this is indicated generally at 156. It can be seen that a sum of signals 152, 154, 156 would equal the signal 150. The three signals 152, 154, 156 are all substantially two state signals, oscillating between 0 and 1. In this example it is of course assumed that the on state has been normalized to 1.

Returning to FIG. 6, a multiplexer 160 time division multiplexes the "phases" and outputs the multiplexed signal to electrical-to-optical converter 118a. Transmitters 116b and 116c are identical to transmitter 116a.

Figure 8:
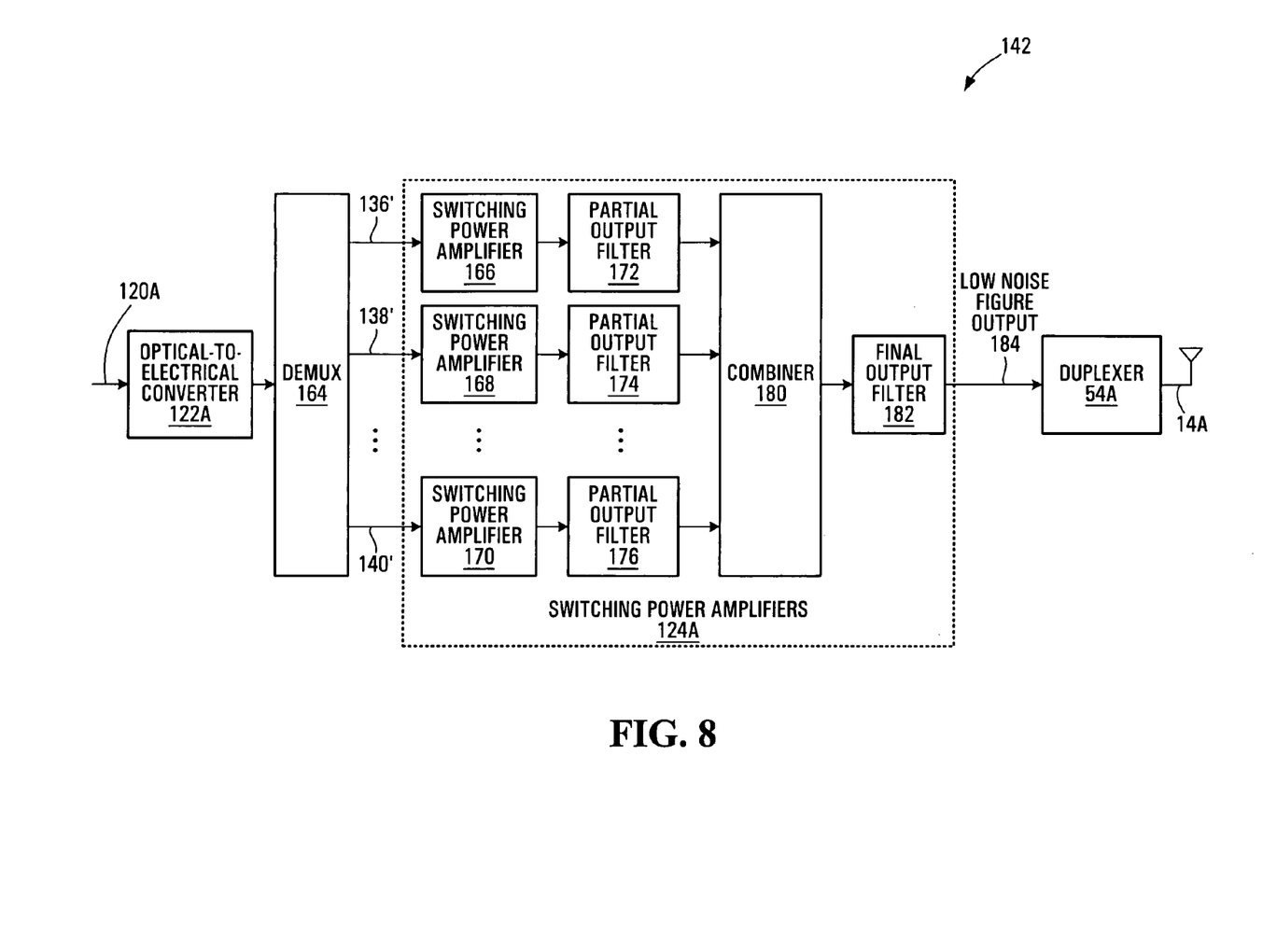
FIG. 8 is a schematic detail of another portion of FIG. 5.

FIG. 8 illustrates the components, at the mast head 142, associated with antenna 14a. An optical-to-electrical converter 122a is connected to the mast head end of optical fibre 120a and outputs an electrical signal to de-multiplexer 164. The de-multiplexer sends each of the re-generated electrical "phases" 136', 138', 140' to a switching power amplifier 166, 168, 170, respectively. The power amplifiers output to partial output filters 172, 174, 176 which in turn output to a combiner 180. The combiner outputs to a final output filter 182 which, in turn outputs to the antenna 14a through duplexer 54a.

The optical-to-electrical converter 122a is designed such that the power in each of the phase signals 136', 138', 140' has an on state which will saturate the respective switching power amplifiers 166, 168, 170 to which it is fed. Thus, signal phase 136' has an on state which will saturate switching power amplifier 166, phase 138' will have an on state which will saturate switching power amplifier 168, and signal phase 140' will have an on state which will saturate switching power amplifier 170. In a preferred embodiment, the power of the on states for the N−1 phases are equal so that the N−1 switching power amplifiers 166, 168, 170 can be made identical.

Each of the switching power amplifiers 166, 168, 170 perform switching power amplification on the respective input signals 136', 138', 140'. Any suitable switching amplifier topology can be employed. Eligible topologies include but are not limited to class D, class S, class E and class F amplifiers, and buck, boost and flyback converters. The amplified signals produced by the switching power amplifiers 166, 168, 170 are filtered by partial output filters 172, 174, 176. The outputs of the partial output filters 172, 174, 176 are summed with combiner 180. This can be implemented with any suitable combining technology. The combiner produces a combined signal which is output to the final output filter 182 which filters out-of-band noise to produce the overall output 184. The partial output filters and the overall output filter achieve an overall filter response.

The overall output 184 is a re-constituted, and amplified, Sigma-delta modulated signal 132 (FIG. 6) which is radiated by antenna 14a. The mast head components associated with antennae 14b and 14c are identical to those described in conjunction with antenna 14a. Accordingly, multiplexed phase signals on optical fibre 120b and 120c is similarly re-constituted into amplified Sigma-delta modulated signals which are radiated on antennae 14b and 14c.

The phase splitting methodology described in conjunction with FIG. 7 has the disadvantage that the switching power amplifier responsible for amplifying the lowest phase, namely the signal content between "0" and "1" will be on much more of the time than the switching power amplifier responsible for amplifying the largest phase 152. In the illustrated example, the average on time for the lowest phase is 9.2 samples and the average off time 1.1 samples. For the medium phase, the average on time is 5.2 samples and the average off time is 5.6 samples. Finally, the average on time for the highest phase 152 is 1 sample and the average off time is 5.5 samples. It is noted that in the illustrated example, the first phase 152 has more transitions than the third phase 156. The number of transitions affects efficiency.

In another embodiment, a more intelligent phase splitting method is employed in the phase splitter 134. This method attempts to reduce the number of switching events that will occur in each of the resulting two-level signals while at the same time equalizing the switching events between the phases. If the modulator produces equal size quantization steps, then the output of the Sigma-Delta converter can be considered to indicate how many phases of the converter need to be active, without specifying which of the phases are active. The phase splitter 134 then allocates the on states between the phases to achieve desired switching characteristics. In a preferred implementation, there is a substantially equal distribution of on and off states among the phases. Reducing the number of transitions (off→on, on→off) increases the efficiency.

Other constraints can be imposed upon the phase splitter 134. For example, there can be maximum on time or maximum off time for any of the switching power amplifiers.

In the above-described embodiment, each phase includes a partial filter which eliminates some of the out-of-band noise signals. After the phases are combined, the final output filter 182 eliminates any remaining out-of-band noise signals. In another alternative embodiment, there are no partial output filters 172, 174, 176. Rather, the outputs of the amplifier phases are directly combined so that the sum of each phase results in the original desired signal including out-of-band noise signals generated by the sigma-delta modulator 130. A filter is then applied to the combined output signal to exclude the out-of-band noise while retaining the desired original signal. In another alternative embodiment, each amplifier includes a respective filter that entirely excludes the out-of-band noise signal. The summation of the phases thus filtered would then only include the desired original signal. In this case, there would be no requirement for the final output filter 182.

Further detail in respect of decomposing a Sigma-delta modulated signal into digital phases is provided in U.S. application Ser. No. 10/449,105 filed Jun. 2, 2003 in the name of Smiley et al., the contents of which are incorporated by reference herein.

From the foregoing, it will be apparent that a signal for transmission in a sector is converted to digital phases, which phases are multiplexed and converted to optical signals for transmission up the mast along a single optical fibre of a fibre bundle. The signals for transmission in the other sectors are similarly handled and transmitted along other optical fibres of the fibre bundle. Thus, the signals for transmission are transmitted up the mast on a single physical medium: a fibre bundle. Optionally, rather than using a fibre bundle, a single fibre may run up the mast and the optical signals may be multiplexed onto this fibre (i.e., using wavelength division multiplexing: WDM).

Figure 9:
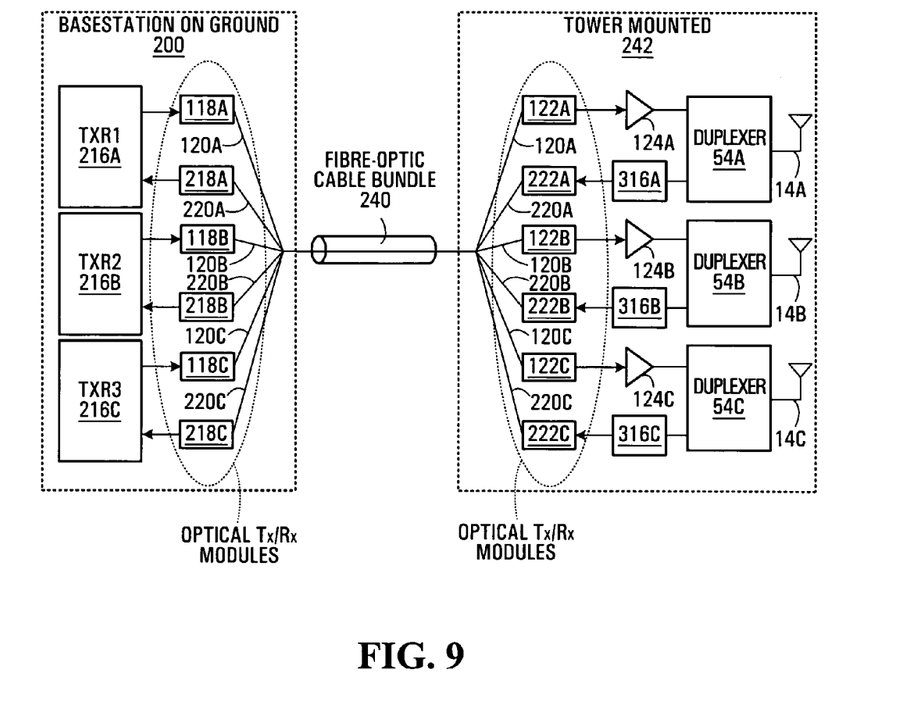
FIG. 9 is a schematic detail of the BTS and mast of FIG. 1 configured in accordance with a third aspect of this invention.

The embodiment of FIG. 5 is only designed to transmit signals, and not to receive signals. The embodiment of this invention illustrated in FIG. 9 is designed to both transmit and receive signals. Turning to FIG. 9, wherein like parts to those of FIG. 5 are given like reference numerals, BTS 200 has transceivers 216a, 216b, 216c, each of which is coupled to an electrical-to-optical converter 118a, 118b, 118c and an optical-to-electrical converter 218a, 218b, 218c, respectively. The electrical-to-optical converters output to respective optical fibre 120a, 120b, 120c. The optical-to-electrical converters are input from optical fibres 220a, 220b, 220c, respectively. These optical fibres are bundled into cable 240 which runs up the mast. At the head 242 of the mast, the optical fibres are unbundled and fibres 122a, 122b, 122c are connected to a respective one of the optical-to-electrical converters 122a, 122b, 122c whereas fibres 220a, 220b, 220c are connected to a respective one of electrical-to-optical converters 222a, 222b, 222c.

The electrical signals output from the optical-to-electrical converters 122a, 122b, 122c pass through respective power amplifiers 124a, 124b, 124c to respective antennae 14a, 14b, 14c through duplexers 54a, 54b, 54c.

Signals received by antennae 14a, 14b, 14c pass through a respective duplexer 54a, 54b, 54c and input a respective transmitter 316a, 316b, 316c. The signals output by the transmitters 316a, 316b, 316c output to a respective electrical-to-optical converter 222a, 222b, 222c.

Each of transceivers 216a, 216b, 216c in the BTS 200 has a first portion configured identically to transmitter 116a of FIG. 6, which portion outputs to its respective electrical-to-optical converter 118a, 118b, 118c. Each of transceivers 216a, 216b, 216c also has a second portion configured identically to de-multiplexer 164 and switching power amplifier 124a of FIG. 8. This second portion is input from its optical-to-electrical converter 218a, 218b, 218c, respectively.

Each of transmitters 316a, 316b, 316c in the mast head is identical to transmitter 116a of FIG. 6.

In consequence of this arrangement, signals received at the BTS for transmission are handled identically to the manner of their handling in the described embodiment of FIG. 5. Signals received at the antennae 14a, 14b, 14c are Sigma-delta signals. These are decomposed into digital phases by transmitters 316a, 316b, 316c for conversion to the optical domain and transmission along optical fibres 220a, 220b, 220c. At the BTS, these optical signals are converted back to electrical signals and demultiplexed, amplified, filtered, and combined in the second portion of respective transceivers 216a, 216b, 216c. Thus, the signals transmitted and received pass up and down the mast on a single physical medium: a fibre bundle. Again, optionally, using WDM, rather than using a fibre bundle, a single fibre may be used.

While the example embodiments have been described in conjunction with a three sector system, with one transmit and one receive signal per sector, it is important to realise that the teachings of this invention are equally applicable to a system having a different number of feeders per sector or more or less than three sectors per cell site. For example, an Omni-Sector BTS may be deployed in a low capacity rural network to provide coverage to a small village, etc. In such a case, the BTS may only support a single sector. Furthermore, in a large majority of deployments, each sector will have one transmit signal and two receive signals per sector. Such a cell site is configured with two antennae for each sector and two RF cables connecting each antenna to the BTS. The main antenna and main RF cable carry a transmit signal and receive signal while the diversity antenna and diversity RF cable are used exclusively for receive. In yet other deployments such as MIMO (multiple input, multiple output) or 4-Branch receive diversity, there may be four antennae per sector: Two antennae may be used to transmit as well as receive while two other antennae may be used exclusively for receive. In GSM deployments where each carrier has moderate capacity, each sector may be required to handle a large numbers of carriers. Eight or more carriers are typical of a mature GSM network. Thus, it will be appreciated that the teachings of this invention may be extended to multiplex N transmit signals, N main receive signals and N diversity receive signals onto a common physical medium.

Other modifications will be apparent to those skilled in the art and, therefore, the invention is defined in the claims.

What is claimed is:

1. A method for use in transmitting cellular signals comprising:

modulating an input signal for transmission to obtain a sigma-delta modulated (SDM) signal;

decomposing said SDM signal into a plurality of phase signals having plural corresponding phases, each of the phase signals being a two state signal;

fibre optically transmitting said phase signals up a mast to an antenna structure.

2. The method of claim 1 further comprising:

combining said phase signals received from said fibre optically transmitting to obtain a re-constituted SDM signal; and wirelessly transmitting a signal based on said re-constituted SDM signal.

3. The method of claim 2 further comprising amplifying said phase signals prior to said fibre optically transmitting.

4. The method of claim 3 wherein said wirelessly transmitting comprises modulating said re-constituted SDM signal on a carrier wave.

5. The method of claim 1, wherein decomposing said SDM signal into the plurality of phase signals comprises decomposing said SDM signal into the plural phases using thresholding phase allocation.

6. The method of claim 5, wherein using thresholding phase allocation comprises identifying the plural phases based on identifying portions of said SDM signal in different amplitude ranges.

7. The method of claim 2, wherein combining the phase signals comprises summing the phase signals to provide said re-constituted SDM signal.

8. The method of claim 1, wherein decomposing said SDM signal into the plurality of phase signals comprises reducing a number of switching events and substantially equalizing a number of switching events between the phases.

9. A system comprising:
    a transmitter to receive an input signal, the transmitter comprising:
        a modulator to modulate the input signal to produce a sigma-delta modulated (SDM) signal; and
        a splitter to phase split the SDM signal into a plurality of phases to provide plural corresponding phase signals; and
        an electrical-to-optical converter to convert the plural phase signals into optical signaling communicated over an optical fiber link to an antenna structure.

10. The system of claim 9, wherein the splitter performs phase splitting using thresholding phase allocation to split the SDM signal into the plurality of phases.

11. The system of claim 10, wherein the thresholding phase allocation identifies the plural phases based on identifying portions of the SDM signal in different amplitude ranges.

12. The system of claim 9, further comprising a mast head associated with the antenna structure, wherein the mast head comprises:
    an optical-to-electrical converter to convert the optical signaling into re-generated phase signals; and
    a combiner to combine the re-generated phase signals to produce a re-constituted SDM signal.

13. The system of claim 12, wherein the combiner performs summing of the re-generated phase signals to produce the re-constituted SDM signal.

14. The system of claim 12, further comprising, a mast between the mast head and transmitter, wherein the optical fibre link extends along the mast.

* * * * *